(12) United States Patent
Pratt et al.

(10) Patent No.: US 7,131,672 B2
(45) Date of Patent: Nov. 7, 2006

(54) LATCH MECHANISM

(75) Inventors: John D. Pratt, Laguna Niguel, CA (US); Timothy S. Rozema, Ladera Ranch, CA (US)

(73) Assignee: Hartwell Corporation, Placentia, CA (US)

( * ) Notice: Subject to any disclaimer, the term of this patent is extended or adjusted under 35 U.S.C. 154(b) by 0 days.

(21) Appl. No.: 10/429,630

(22) Filed: May 5, 2003

(65) Prior Publication Data

US 2004/0012212 A1    Jan. 22, 2004

Related U.S. Application Data

(60) Provisional application No. 60/377,579, filed on May 3, 2002.

(51) Int. Cl.
*E05C 19/12* (2006.01)

(52) U.S. Cl. .................................. 292/113; 292/201

(58) Field of Classification Search ............. 292/201, 292/144, 341.16, 113; 70/277, 432
See application file for complete search history.

(56) References Cited

U.S. PATENT DOCUMENTS

| | | | | |
|---|---|---|---|---|
| 2,567,114 A | * | 9/1951 | Linn | 244/102 SL |
| 4,006,471 A | * | 2/1977 | Pappas | 340/542 |
| 4,264,092 A | | 4/1981 | Bourne | 292/241 |
| 5,429,400 A | * | 7/1995 | Kawaguchi et al. | 292/201 |
| 5,810,055 A | * | 9/1998 | Haeussler et al. | 139/57 |
| 6,042,156 A | | 3/2000 | Jackson | 292/26 |
| 6,279,971 B1 | | 8/2001 | Dessenberger, Jr. | 292/113 |
| 6,325,428 B1 | | 12/2001 | Do | 292/113 |
| 6,381,999 B1 | * | 5/2002 | Doong | 70/107 |
| 6,382,690 B1 | * | 5/2002 | Dessenberger, Jr. | 292/341.18 |
| 6,439,009 B1 | * | 8/2002 | Heese et al. | 70/92 |
| 6,442,986 B1 | * | 9/2002 | Russell et al. | 70/278.3 |
| 6,496,101 B1 | * | 12/2002 | Stillwagon | 340/5.61 |
| 6,709,029 B1 | * | 3/2004 | Cole | 292/110 |

* cited by examiner

*Primary Examiner*—Gary Estremsky
(74) *Attorney, Agent, or Firm*—Barnes & Thornburg LLP

(57) ABSTRACT

A latch mechanism in combination with a sensor assembly for use in latching a first structure to a second structure such as a panel to an aircraft. Also disclosed is a sensor assembly for use with a latch mechanism and a method of using a sensor assembly in combination with a latch mechanism. The latch mechanism and sensor assembly include a hook mechanism carried on a first structure and a keeper mechanism retained on a second structure. The sensor assembly is connected to the hook mechanism or the keeper mechanism or with both for detecting characteristics thereof. An output device of the sensor assembly is provided for at least indicating the condition of the sensor device. A power interface for providing power to the sensor assembly or recharging a power source of the sensor assembly or both. A display coupled to the controller for displaying information about the sensor assembly.

21 Claims, 4 Drawing Sheets

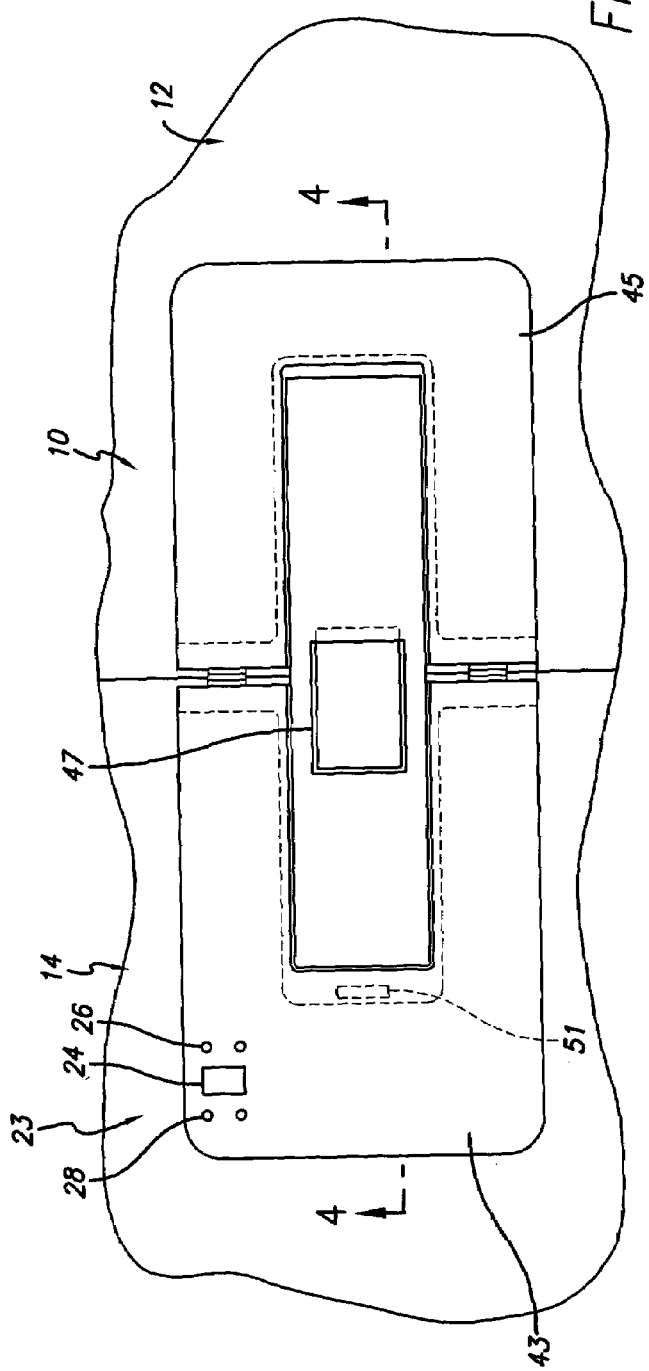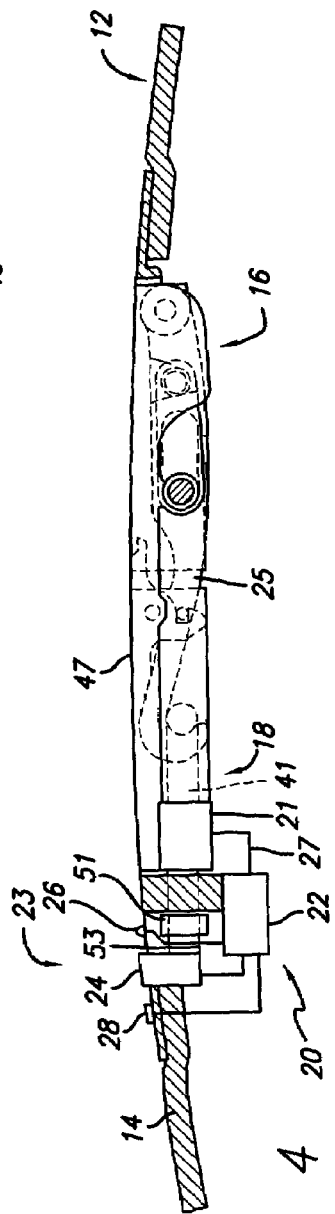
FIG. 3
FIG. 4

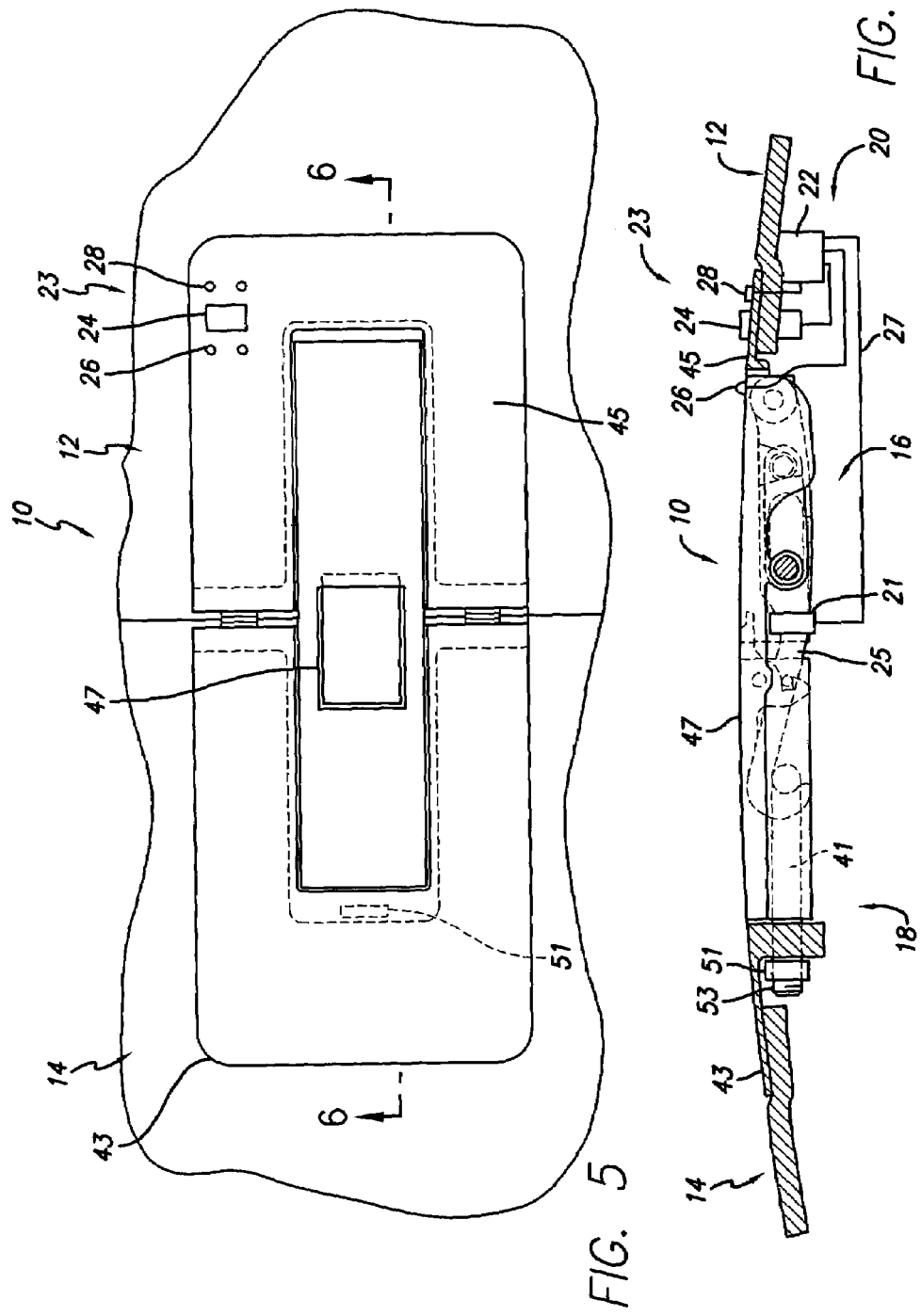

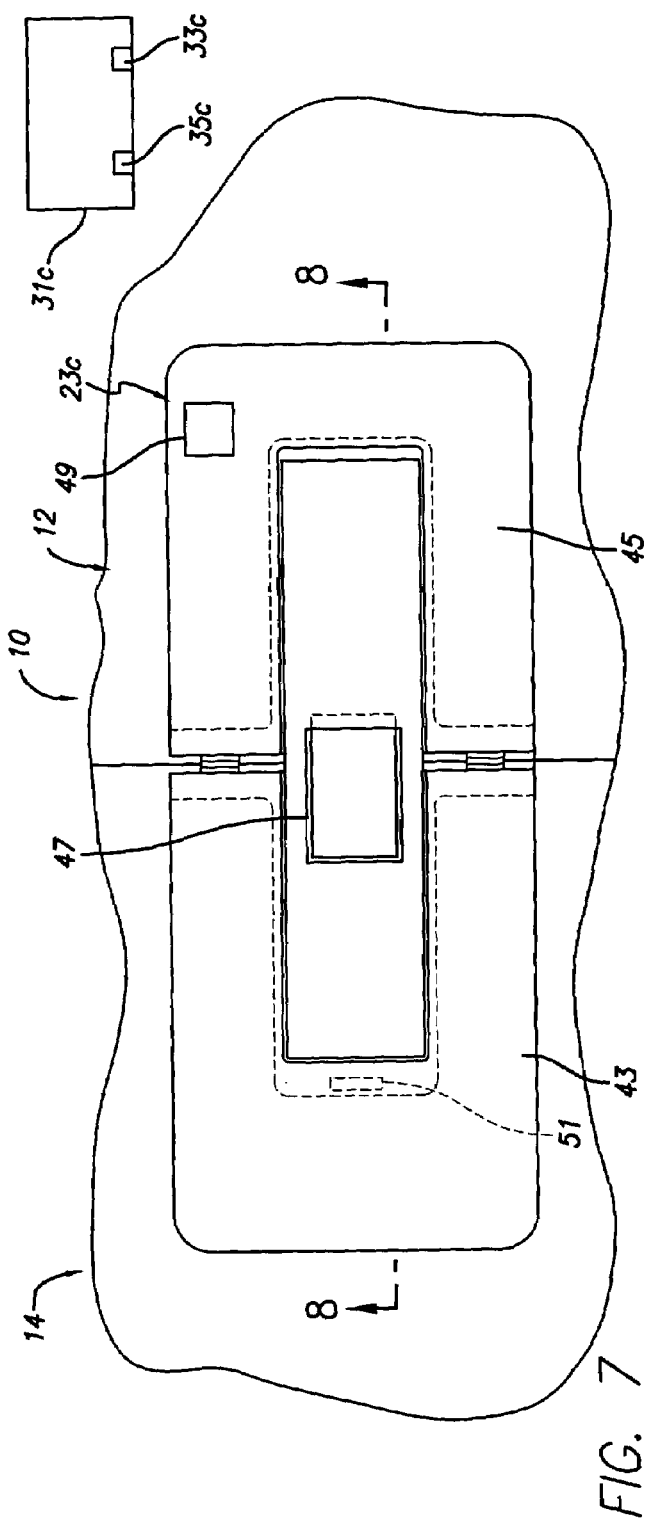
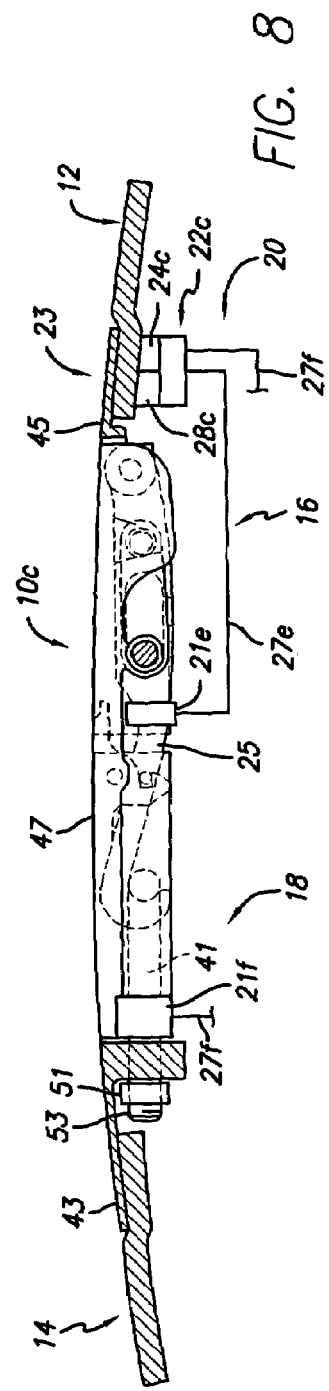

LATCH MECHANISM

CROSS-REFERENCE

This application claims the benefit of U.S. Provisional Application No. 60/377,579, filed May 3, 2002 which is expressly incorporated herein by reference.

BACKGROUND

The present invention relates generally to the field of latch mechanisms and, more particularly, to a latch mechanism utilized in an aircraft in combination with a sensor associated with the latch mechanism.

According to the disclosure, a latch mechanism for use on an aircraft includes a sensor configured to report the status, load, position as well as other characteristics of the latch mechanism. Illustratively, one or more latches may be positioned on a cowl of an aircraft engine. The sensor signals to a processor or controller which in turn processes and provides signals to a display or an output terminal. The display or output is provided to a pilot or technician who can determine whether the latch is latched or unlatched, what loads are present in the latch, the overload history, date of manufacture of certain components, number of load cycles, as well as other information recorded by the latch mechanism.

Additional features of the disclosure will become apparent upon consideration of the following detailed description of embodiments of the disclosed latch mechanism.

BRIEF DESCRIPTION OF THE DRAWINGS

The detailed description particularly refers to the accompanying figures in which:

FIG. 3 is a top plan view of a latch mechanism;

FIG. 4 is a partial fragmentary cross-sectional view taken along line 4—4 of FIG. 3 including diagrammatic components relating to the sensor assembly of the disclosure, in which the sensor assembly is coupled to the keeper mechanism;

FIG. 5 is a top plan view of a latch mechanism;

FIG. 6 is a partial fragmentary cross-sectional view taken along line 6—6 of FIG. 5 including diagrammatic components relating to the sensor assembly of the disclosure, in which the sensor assembly is coupled to the hook mechanism;

FIG. 7 is a top plan view of a latch mechanism; and

FIG. 8 is a partial fragmentary cross-sectional view taken along line 8—8 of FIG. 7 including diagrammatic components relating to the sensor assembly of the disclosure, in which sensing devices are associated with the keeper and hook mechanisms and coupled to a controller.

DETAILED DESCRIPTION OF THE DRAWINGS

Figure 1:
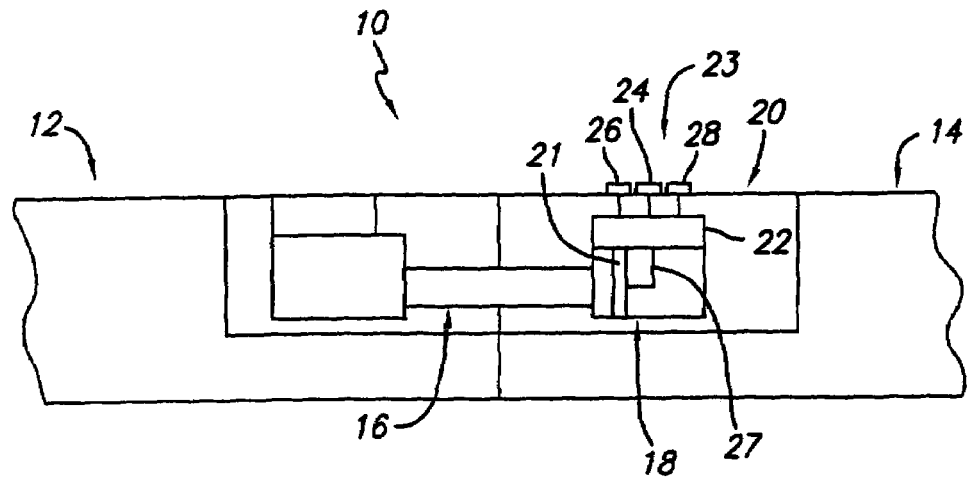
FIG. 1 is a diagrammatic view of an example of a latch mechanism in combination with a sensor according to the present disclosure in which a sensor assembly is coupled to a keeper portion of the latch mechanism.

While the present disclosure may be susceptible to embodiment in different forms, there is shown in the drawings, and herein will be described in detail, an embodiment with the understanding that the present description is to be considered an exemplification of the principles of the disclosure and is not intended to limit the disclosure to the details of construction and the arrangement of components set forth in the following description or illustrated in the drawings.

The figures show broad diagrammatic representations of a sensor assembly 20. The sensor assembly is described in greater detail below and some specific embodiments of components are identified. Generally, a latch mechanism 10 of known construction is employed in combination with the sensor assembly 20. For example, one embodiment of a latch mechanism 10 employed with the sensor assembly 20 is that as shown in U.S. Pat. No. 5,152,559 to Henrichs, assigned to the assignee of the present application. Reference to the latch mechanism 10 as disclosed in Henrichs '559 is incorporated by reference in its entirety. It is envisioned that one of skill in the art will appreciate the disclosed embodiments of the latch mechanism 10 and sensor assembly 20 combination and will be enabled to perform the invention as claimed herein from this description.

As shown diagrammatically in FIG. 1, a latch mechanism 10 for joining a first structure 12 to a second structure 14 illustratively includes a hook 16 coupled to first structure 12 and a keeper 18 coupled to second structure 14. A sensor assembly 20 is coupled to keeper 18 for sensing a load or condition of keeper 18. Sensor assembly 20 may be any apparatus capable of sensing a load or stress or condition of keeper 18 such as, for example, a resistive pressure sensor configured to vary the resistance in an electrical circuit based on the load sensed by the sensor assembly 20. While this is the disclosed embodiment for sensing the load and/or condition, one of ordinary skill in the art will appreciate that there may be other structures or devices for sensing the load and/or condition within the scope of this application.

The sensor assembly 20 described in this application includes the use of the sensor assembly 20 as a retrofittable device. In this regard, the sensor assembly 20 can be provided for use with any one of a variety of latch mechanisms. The latch mechanism may be that as shown in the drawings or any other of a variety of forms of latch mechanism.

Illustratively, the sensor device 21 of the sensor assembly 20 is electrically coupled to a processor or controller 22. Processor 22 determines, stores and communicates the condition or load on sensor 21 based on the signals received from sensor 21. After such load or condition is determined, processor 22 reports the signals to at least one output device 23. In the illustrated embodiment, processor 22 reports signals via means for outputting information such as output terminal 24 and display 26. However, it is within the scope of the disclosure to report the signals to only one of the reporting means or output terminal 24 and display 26, or to any other output known in the art.

Figure 2:
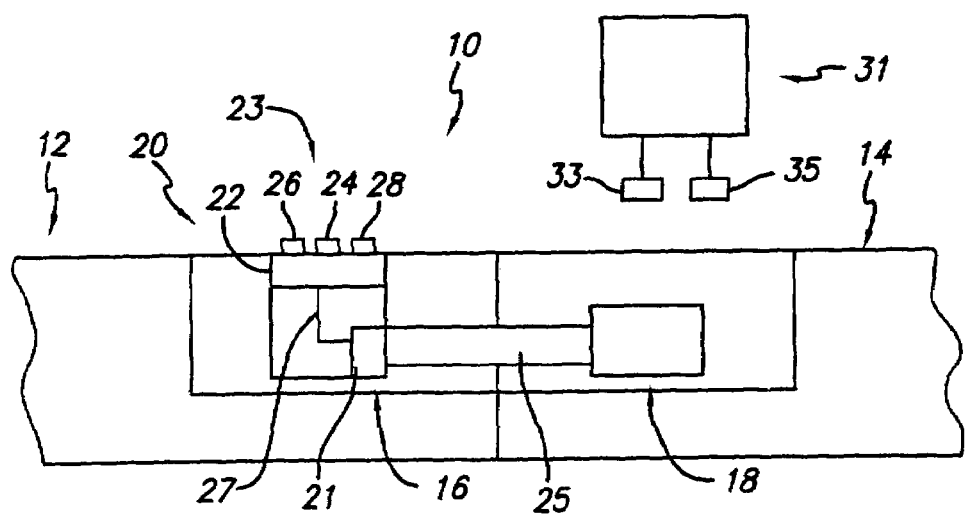
FIG. 2 is a diagrammatic view of a latch mechanism having a sensor according to the present disclosure in which the sensor assembly is coupled to a hook mechanism of the latch assembly.

With reference to FIG. 2, a similar general diagrammatic illustration of the latch mechanism 10 including the sensor assembly 20 is provided. In this embodiment, the sensor assembly 20 is associated with the hook mechanism 16. In this regard, the sensor 21 is directly associated with the structures of the hook mechanism 16 to detect various conditions on the structures. For example, a hook arm 25 extending from the hook mechanism 16 to the keeper mechanism 18 can be configured with the sensor 21. In this regard, the sensor 21 can be embedded in the structure of the hook to sense the various characteristics related to the hook condition 25. The sensor 21 is coupled to the processor or controller 22 via line 27. As disclosed line 27 can be in the form of a wired or wireless connection which facilitates communication of information sensed by the sensing device 21 to the controller 22.

The controller 22 as illustrated herein may be polled for information by mechanical connections or display such as the terminal 24 or display 26. This is achieved by an operator attaching a device to obtain information, for example, from the output terminal 24. Alternatively, the user can observe a display 26 such as an LED or LCD display. It is fully within the scope of the present application to include any form of display which is currently in existence or may be devised of for this application. As will be described in greater detail below with reference to FIGS. 7 and 8, the mechanical interface and display of the terminal 24 and/or display 26 may be eliminated and an inductive coupling system (see FIGS. 7 and 8 and description below) may be employed to transfer information to and from a user. Alternatively, the information may be a one-way information pass such that it is only collectible by the user.

Additionally, it is fully within the scope of the present application that the processor or controller 22 may be in the form of a wired or wireless connection which can communicate with a larger device on board of the aircraft or other structure which uses the latch mechanism 10 with the sensor assembly 20. In this regard, multiple latch mechanisms 10 may employ multiple, corresponding sensor devices 21 associated with the latch mechanism. In one embodiment, the processor 22 of each latch mechanism acts as an independent processor. However, in another embodiment of this disclosure, each of the processors 22 may report to a single processor whereby information can be gathered in a single step. This may be envisioned as multiple sensors reporting to a common unit. An example of an application of this embodiment might be on an aircraft door assembly in which multiple latch mechanisms 10 are employed. In such an embodiment, the latch mechanisms may need to provide information in a coordinated fashion to indicate the status of the panel. Alternatively, multiple latches which are not necessarily directly associated with a single panel may report to a single processor 22 to provide overall latch mechanism status information.

It will be appreciated by one of skill in the art that the connections and lines shown as paths or circuits in the diagrammatic illustrations are considered to be hardwire or wireless. In this regard, the connections can be hardwired by way of conductive wiring or optical fiber as well as wireless in the form of radio frequency, optical path, microwave or any other form of wireless communication connection. The communication connections between the devices are intended to be broadly interpreted. Additionally, the sensor devices 21 disclosed herein are intended to be broadly interpreted as sensing devices which can sense conductivity, strain, temperature, pressure, torsion, compression, tension, acoustic waves, as well as any other sensing of the conditions or characteristics of a latch mechanism 10 which might be relevant to a user. In this regard, the characteristics may also include information such as the date of manufacture of the latch, the identity of the manufacturer such as by serial code or name, the number of cycles in which the latch has been actuated, the load on the latch mechanism during a given cycle, loading over a given cycle such that peak loads and minimum loads may be identified over a given period of time, the time during which the latch mechanism 10 was in a connected state, the time during which the latch mechanism was in an unconnected state, the remaining life of a latch mechanism which may have a life limited to hours of service, hours of connection, hours of disconnection or other limitations. Additionally, the output and display 24, 26 may relay information from the processor when the processor indicates that the latch mechanism 10 is about to expire. Advanced warnings can be embedded in this programming and are fully within the scope of the present application.

A benefit of the present disclosure is that it is envisioned that at least one embodiment can be used without special tools. In this regard, as shown in FIG. 2, a data collection device 31 is provided which can be coupled to the output terminal 24 and a power interface or terminal 28. An output terminal connector 33 can be connected to the output terminal 24 and a power connector 35 can be connected to the power terminal 28. These devices can be a snap-fit coupling or other coupling which does not require tools for assembly. This helps to facilitate ease of transfer of information from the sensor assembly 20 to the data collection device 31. The power interface may also be an inductive power transfer device as well as a replaceable battery.

It is envisioned that the data collection device also includes a power source which can power the transfer of information from the processor 22. Additionally, the coupling of the terminal 28 to the connector 35 facilitates recharging of the processor 22. In yet another embodiment, non-standard connectors can be designed for the connector and terminal combinations 24, 33 and 28, 35 to interfere with unintended use of the sensor assembly 20. While specialized connectors can be provided, connector devices using specialized tools can also be provided to further interfere with the unintended use of these assemblies.

Signals reported from processor 22 to output terminal 24 or display 26 may include signals representative of the load placed on keeper 18, the condition of keeper 18 (i.e. whether it is latched, partially latched or unlatched) the load and/or overload history, the date of manufacture of certain components, the number of load cycles, and any other information relevant to the use, function, or maintenance of latch mechanism 10. In one embodiment, processor 22 comprises a "Dallas" chip, which is commercially available from Maxim Integrated Products, Inc., Sunnyvale, Calif.

In one embodiment, output terminal 24 is illustratively a suitable Molex connector, which is commercially available from Molex Corporation, Lisle, Ill. However, it is within the scope of the disclosure to use any type of output terminal or connection which permits information such as that discussed above to be communicated as output. Display 26 can be any display known in the art, such as a liquid crystal display or an LED display. Other displays are within the scope of the disclosure. Latch mechanism 10 also illustratively includes a battery connector 28 for connecting a user-provided battery to latch mechanism 10 and thereby providing power for electrical components to operate. Such a construction eliminates the need for a battery to be carried by latch mechanism 10. However, it is within the scope of the disclosure to have a battery carried on latch mechanism 10. Such a battery could be rechargeable, or could be replaceable. If rechargeable, battery connector 28 could be a battery charging terminal.

As shown in FIGS. 3 and 4, an embodiment is provided based on the latch mechanism 10 as disclosed in the Henrichs '559 patent incorporated herein by reference above. As shown, a sensor assembly 20 is associated with the keeper mechanism 18. The sensor assembly includes the processor 22 connected to the sensor device 21. In this embodiment, the sensor device 21 can be carried on, embedded in, or surround a shaft 41 of the keeper assembly 18. As shown, the hook 25 engages the keeper assembly 18 to retain the first and second structures 12, 14 in engagement. The latch assembly includes a keeper housing 43 and a hook housing 45. A trigger 47 is provided to retain the hook 25 in engagement with the keeper shaft 41 and to facilitate disengagement of the hook 25 from the keeper shaft 41. The specific structure and function of the trigger 47 is disclosed in greater detail with regard to the Henrichs '559 patent incorporate herein above. A variety of other triggers 47 may be used with other latching mechanisms 10 all being fully within the scope of the combined sensor assembly 20 and latch mechanism 10 as disclosed herein.

With reference to FIGS. 3 and 4, the output devices are shown as a power connection 28 including two terminals, configured for one positive and one negative terminal, a connector 24 and two LED's representing the display 26. For example, in one embodiment, the display as shown in FIG. 3 using two LED's can indicate a go/no-go situation. For example, if one LED is red it will be illuminated to indicate that the latch is not engaged. A second LED, for example green, will indicate that the latch is assembled and retained in a desired condition indicating a "go" situation. As described above, it is envisioned that the display 26 can be limited to information flow to and from or from the sensor assembly 20 by way of the connector 24. Further, as described in greater detail below, it is envisioned that all of these output devices 23 can be eliminated by use of wireless or other technologies.

FIG. 5 is an embodiment of the latch assembly 10 similar to that as shown in FIGS. 3 and 4. In this embodiment, the sensor assembly 20 and the devices 23 are positioned relative to the hook assembly 16 and hook housing 45. Further, the sensor device 21 is coupled to, carried one, embedded in or otherwise associated with the hook 25. The sensor assembly 21 as described above senses of the various characteristics or conditions of the hook 25 instead of the retainer shaft 41.

With further references to FIGS. 7 and 8, the sensor assembly 20 is shown including sensor devices 21e and 21f, one each being associated with the hook 25 and the keeper member 41. The controller 22 is shown in a form which does not have any outward physical connectors (23) as shown in FIGS. 1–6. While it is envisioned that the embodiment shown in FIGS. 7 and 8 could also use these physical extensions for the connectors 24, 26, 28, this embodiment shows an inductively coupled form of the controller 22. Conductive coupling devices are well-known in the art which facilitate transfer of information and power without direct physical contact with the device. In this regard, the sensor assembly 20 includes an interface 49 which helps to guide a user to a position at which the data collection device 31 can be placed. In this regard, the data collection device 31 as shown in FIG. 2 does not include the specific physical terminals 33, 35, but instead includes associated conductive terminals for communicating information and transferring power with the sensor assembly 20. As shown in FIG. 8, the connections 27e, 27f with the sensor devices 21e, 21f connected to the processor 22c are shown as paths. These paths as described above are intended to be broadly interpreted physically connected such as by conductive wiring or optical fiber as well as wireless connections. It is also envisioned that the location of the processor 22c can be reversed such that it is positioned in closer proximity to the keeper mechanism 18 as opposed to the hook mechanism 16 as shown in FIG. 8.

It is also envisioned that a sensor can be placed in proximity to the trigger 47 in any one of these embodiments to provide information about the state, characteristics or condition of the trigger 47. Similar to the sensor devices 21 as described throughout this application, a sensor device can be placed on or coupled with the trigger 47 to provide such information.

Latch mechanism 10 may be used, for example, in the following manner. Illustratively, a plurality of latch mechanisms 10 may be provided for securing two cowl halves together on a fan cowl for an aircraft engine. When service or inspection of the fan cowl is performed, each of the latch mechanisms must be unlatched. This can be done remotely with an electrical switch. However, upon closing the plurality of latch mechanisms 10, it is desirable for an aircraft pilot or technician to know that each of the latches is closed and performing as expected. This information can be received from each latch mechanism by a series of displays 26 positioned either externally or in the cockpit, or alternatively by routing the data through output terminals 24 to a data receiver positioned inside the aircraft. In such an embodiment, battery connector 28 would be directly connected to the aircraft power source.

Alternatively, latch mechanism 10 could be used to ascertain service needs. A user or technician connects power, i.e. a battery to power connector 28. Processor 22 receives signals from sensor device 21 and processes and reports those signals to display 26. Alternatively or additionally, processor 22 could report the signals to output terminal 24 for use or analysis by an external device connected or coupled thereto. Illustratively, the external device is a second processor configured to record the data provided by output terminal 24.

In an alternative embodiment, sensor device 21 could be coupled to hook 16 to measure load or condition from the perspective of the hook 16. In yet another embodiment, two sensors 21e, 21f could be provided, with one coupled to the keeper 18 and the other coupled to the hook 16.

In a further alternative embodiment, processor 22 could be disposed remote from latch mechanism 10, such that a user or technician carries processor 22 and connects it to latch mechanism 10 through a terminal. Upon processor 22 being connected to latch mechanism 10 and particularly sensor device 21, processor 22 operates substantially as described above. Display 26 could also be disposed remotely with the processor.

Latch mechanism 10 as disclosed above allows for rapid rigging and assembly onto an aircraft structure. In one embodiment, the sensor 20 and processor 22 are self-contained within the latch mechanism 10.

The latch mechanism helps facilitate rigging or installation and setting of the latch mechanism 10. In this regard, the latch mechanisms as shown in FIGS. 3–8 include an adjustment member 51. The adjustment member 51 is in the form of a rotatable nut which can be adjusted along a threaded shaft 53 to adjust the load on the hook 25 and retainer 41. Each of the embodiments as disclosed herein the sensor assembly 20 can be used to determine the load on the latch mechanism 10. In this regard, while configuring the latch or multiple latches the sensor assembly 20 can be utilized to achieve a desired preload in the latch 10. Additionally, sensor assembly 20 can also be used to calibrate or adjust a latch assembly during a predetermined maintenance cycle or to verify the conditions on a latch in a spot or sampled examination of various latch mechanisms 10.

While a preferred embodiment of the disclosure is shown and described, it is envisioned that those skilled in the art may devise various modifications and equivalents without departing from the spirit and scope of the disclosure as recited in the following claims.

The invention claimed is:

1. A latch mechanism in combination with a sensor assembly in an aircraft to latch a first aircraft structure to a second aircraft structure, said latch mechanism and sensor assembly comprising:
 a hook carried on a first aircraft structure;
 a keeper retained on a second aircraft structure;
 the hook and the keeper comprising a latch mechanism;
 a sensor assembly coupled with at least one of said hook and said keeper for detecting characteristics thereof and electronically coupled to an output device;
 the output device displaying the condition of the latch mechanism inside the aircraft or exteriorly on the aircraft so that an aircraft pilot or aircraft technician can observe the display; and
 an output connector for at least one of sending and receiving information from a controller,
 wherein the output connector is one of an inductive connector and wherein the sensor assembly senses temperature of the latch mechanism.

2. The latch mechanism in combination with the sensor assembly of claim 1, further comprising the sensor assembly being coupled with the hook.

3. The latch mechanism in combination with the sensor assembly of claim 1, further comprising the sensor assembly being coupled with the keeper and wherein the hook and the keeper secure two cowl halves together on a fan cowl of an aircraft engine.

4. The latch mechanism in combination with the sensor assembly of claim 1, further comprising the sensor assembly being coupled with the hook and the keeper and wherein the sensor assembly senses whether the latch mechanism is in a latched or unlatched condition.

5. The latch mechanism in combination with the sensor assembly of claim 1, wherein the output connector is an inductive connector.

6. The latch mechanism in combination with the sensor assembly of claim 1, the sensor assembly further comprising a power interface for at least one of providing power to the sensor assembly and recharging a power source of the sensor assembly.

7. The latch mechanism in combination with the sensor assembly of claim 6, wherein the power interface is an inductive connector.

8. The latch mechanism in combination with the sensor assembly of claim 6, wherein the power interface is a replaceable battery.

9. A latch mechanism in combination with a sensor assembly in an aircraft to latch a first aircraft structure to a second aircraft structure, said latch mechanism and sensor assembly comprising:
 a hook carried on a first aircraft structure;
 a keeper retained on a second aircraft structure;
 the hook and the keeper comprising a latch mechanism;
 a sensor assembly coupled with at least one of said hook and said keeper for detecting characteristics thereof and electronically coupled to an output device;
 the output device displaying the condition of the latch mechanism inside the aircraft or exteriorly on the aircraft so that an aircraft pilot or aircraft technician can observe the display; and
 the sensor assembly further comprising a power interface for at least one of providing power to the sensor assembly and recharging a power source of the sensor assembly,
 wherein the power interface is a conductive connector and wherein the sensor assembly senses peak loading of the latch mechanism over a given period of time.

10. A sensor assembly with a latch mechanism of an aircraft for detecting conditions associated with the latch mechanism, the latch mechanism including a hook carried on a first aircraft structure and a keeper carried on a second aircraft structure, the sensor assembly comprising:
 the sensor assembly carried on at least one of the first aircraft structure and the second aircraft structure;
 a sensor device of the sensor assembly positioned at least proximate to one of the hook and keeper for detecting conditions of at least one of a portion of the hook and a portion of the keeper;
 the hook and the keeper comprising a latch mechanism;
 reporting means electrically coupled with the sensor device located for reporting on the condition of the latch mechanism to a pilot or technician on the aircraft;
 a controller of the sensor assembly operatively associated with the sensor device and selectively couplable with the reporting means; and
 further comprising the sensor assembly being coupled with the hook and the keeper and wherein the sensor device senses the number of cycles the latch mechanism has been actuated.

11. The latch mechanism in combination with the sensor assembly of claim 10, the sensor assembly further comprising a display coupled to the controller for displaying information about the sensor assembly.

12. The sensor assembly for use with a latch mechanism of claim 10, further comprising the sensor assembly being coupled with the hook.

13. The sensor assembly for use with a latch mechanism of claim 10, further comprising the sensor assembly being coupled with the keeper.

14. The sensor assembly for use with a latch mechanism of claim 10, the sensor assembly further comprising an output connector for at least one of sending and receiving information from the controller.

15. The sensor assembly for use with a latch mechanism of claim 14, wherein the output connector is a conductive connector and wherein the sensor device provides information on the remaining life of the latch mechanism.

16. The sensor assembly for use with a latch mechanism of claim 14, wherein the output connector is an inductive connector.

17. The sensor assembly for use with a latch mechanism of claim 10, the sensor assembly further comprising a power interface for at least one of providing power to the sensor assembly and recharging a power source of the sensor assembly.

18. The sensor assembly for use with a latch mechanism of claim 17, wherein the power interface is an inductive connector.

19. The sensor assembly for use with a latch mechanism of claim 17, wherein the power interface is a replaceable battery.

20. The sensor assembly for use with a latch mechanism of claim 10, the sensor assembly further comprising a display coupled to the controller for displaying information about the sensor assembly.

21. A sensor assembly with a latch mechanism of an aircraft for detecting conditions associated with the latch mechanism, the latch mechanism including a hook carried on a first aircraft structure and a keeper carried on a second aircraft structure, the sensor assembly comprising:
- the sensor assembly carried on at least one of the first aircraft structure and the second aircraft structure;
- a sensor device of the sensor assembly positioned at least proximate to one of the hook and keeper for detecting conditions of at least one of a portion of the hook and a portion of the keeper;
- the hook and the keeper comprising a latch mechanism;
- reporting means electrically coupled with the sensor device located for reporting on the condition of the latch mechanism to a pilot or technician on the aircraft;
- a controller of the sensor assembly operatively associated with the sensor device and selectively couplable with the reporting means;
- the sensor assembly further comprising a power interface for at least one of providing power to the sensor assembly and recharging a power source of the sensor assembly, and
- wherein the power interface is a conductive connector and wherein the sensor device provides information on the time the latch mechanism was in a connected state.

\* \* \* \* \*